(12) United States Patent
Yasui et al.

(10) Patent No.: US 8,338,554 B2
(45) Date of Patent: Dec. 25, 2012

(54) HYPERBRANCHED POLYMER AND METHOD FOR PRODUCING THE SAME

(75) Inventors: Kei Yasui, Funabashi (JP); Masaaki Ozawa, Funabashi (JP); Akihiro Tanaka, Funabashi (JP); Hiroki Takemoto, Kitakyushi (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 397 days.

(21) Appl. No.: 12/310,543

(22) PCT Filed: Aug. 29, 2007

(86) PCT No.: PCT/JP2007/066767
§ 371 (c)(1),
(2), (4) Date: Feb. 27, 2009

(87) PCT Pub. No.: WO2008/029688
PCT Pub. Date: Mar. 13, 2008

(65) Prior Publication Data
US 2010/0048845 A1 Feb. 25, 2010

(30) Foreign Application Priority Data

Sep. 1, 2006 (JP) ................................ 2006-237713
Apr. 25, 2007 (JP) ................................ 2007-115855

(51) Int. Cl.
*C08F 12/30* (2006.01)
(52) U.S. Cl. .................. 526/286; 525/328.2; 525/328.4
(58) Field of Classification Search .................. 526/286; 525/328.2, 328.4
See application file for complete search history.

(56) References Cited

FOREIGN PATENT DOCUMENTS

| EP | 1 698 645 A1 | 9/2006 |
|---|---|---|
| EP | 1 950 250 A1 | 7/2008 |
| JP | A-2005-226051 | 8/2005 |
| WO | WO 2005/040233 A1 | 5/2005 |
| WO | WO 2005 061566 A1 | 7/2005 |
| WO | WO 2006/093050 A1 | 9/2006 |
| WO | WO 2007 049608 A1 | 5/2007 |

OTHER PUBLICATIONS

Weimer et al., "Importance of Active-Site Reactivity and Reaction Conditions in the Preparation of Hyperbranched Polymers by Self-Condensing Vinyl Polymerization: Highly Branched vs. Linear Poly[4(chloromethyl)styrene] by Metal-Catalyzed "Living" Radical Polymerization," Journal of Polymer Science: Part A: Polymer Chemistry, 1998, pp. 955-970, vol. 36.

Dec. 17, 2009 Supplementary European Search Report issued in corresponding European Patent Application No. 07 80 6244.5.
Ishizu, Koji et al., "Synthesis of hyperbranched polymers by self-addition free radical vinyl polymerization of photo functional styrene," Macromolecular Rapid Communications, 2000, pp. 665-668, vol. 21, No. 10.
Ishizu, Koji et al., "Novel synthesis of branched polystyrenes by quasi-living radical copolymerization using photofunctional inimer," Polymer International, 50, 2001, pp. 906-910.
Ishizu, Koji et al., "Kinetics of Hyperbranched Polystyrenes by Free Radical Polymerization of Photofunctional Inimer," Macromolecules, 2002, pp. 3781-3784, vol. 35, No. 9.
Ishizu, Koji et al., "Synthesis and characterization of hyperbranched poly(ethyl methacrylate) by quasi-living radical polymerization of photofunctional inimer," Polymer International, 51, 2002, pp. 424-428.
Ishizu, Koji et al., "Kinetics on Formation of Hyperbranched Poly(ethyl methacrylate) via a Controlled Radical Mechanism of Photofunctional Inimer," Macromolecules, 2003, pp. 3505-3510, vol. 36, No. 10.
Ishizu, Koji et al., "Novel synthesis and solution properties of hyperbranched poly(ethyl methacrylate)s by quasi-living radical copolymerization using photofunctional inimer," Polymer International, 53, 2004, pp. 259-265.
Otsu, Takayuki et al., "Features of living radical polymerization of vinyl monomers in homogeneous system using N,N-Diethyldithiocarbamate derivatives as photoiniferters," European Polymer Journal, 1995, pp. 67-78, vol. 31, No. 1.
Gaynor et al., "Synthesis of Branched and Hyperbranched Polystyrenes," Macromolecules, vol. 29, pp. 1079-1081, 1996.

*Primary Examiner* — Edward Cain
(74) *Attorney, Agent, or Firm* — Oliff & Berridge, PLC

(57) ABSTRACT

Disclosed is a novel optically stable hyperbranched polymer whose molecular terminal can be derivatized with various compounds; and a method for producing such a polymer. Specifically disclosed is a hyperbranched polymer having a structure represented by Formula (1)

[Chemical Formula 1]

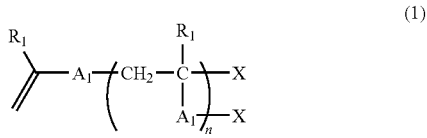

(1)

wherein a halogen atom is at a molecular terminal. The hyperbranched polymer can be obtained by substituting the molecular terminal dithiocarbamate group of a hyperbranched polymer having a dithiocarbamate group at a molecular terminal, which is obtained by living radical polymerization of a dithiocarbamate compound having a vinyl group structure, with a halogen atom. Also disclosed is a hyperbranched polymer wherein an amino group or an ammonium group is at a molecular terminal instead of a halogen atom.

16 Claims, 6 Drawing Sheets

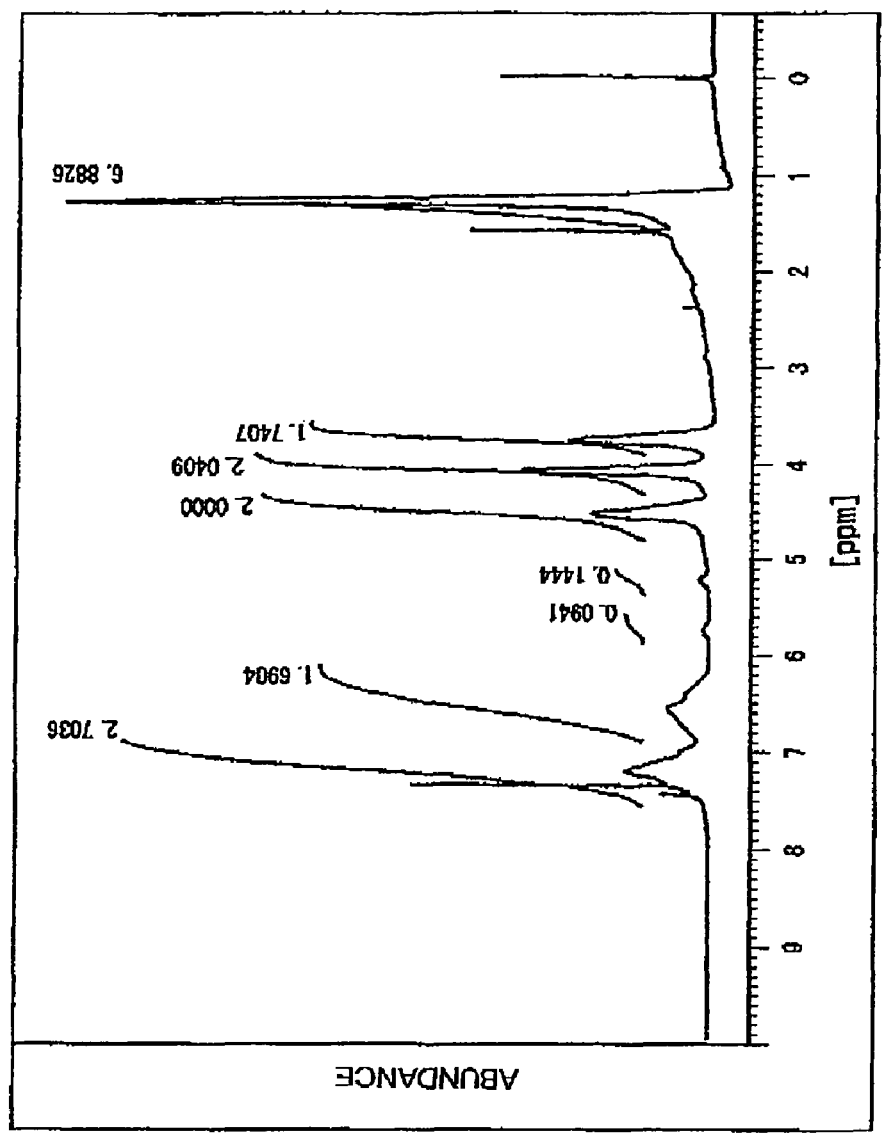
[FIG. 1]

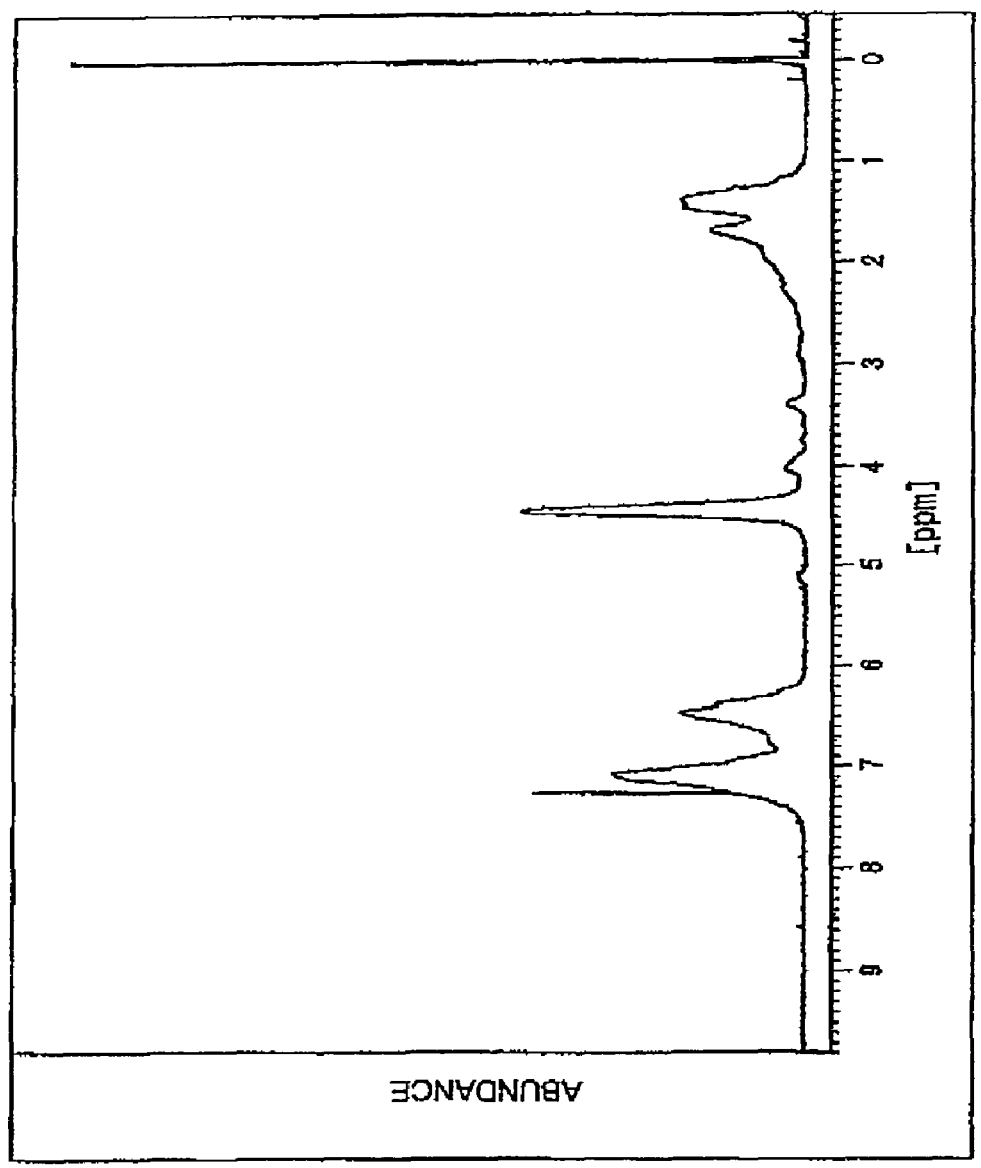
[FIG. 2]

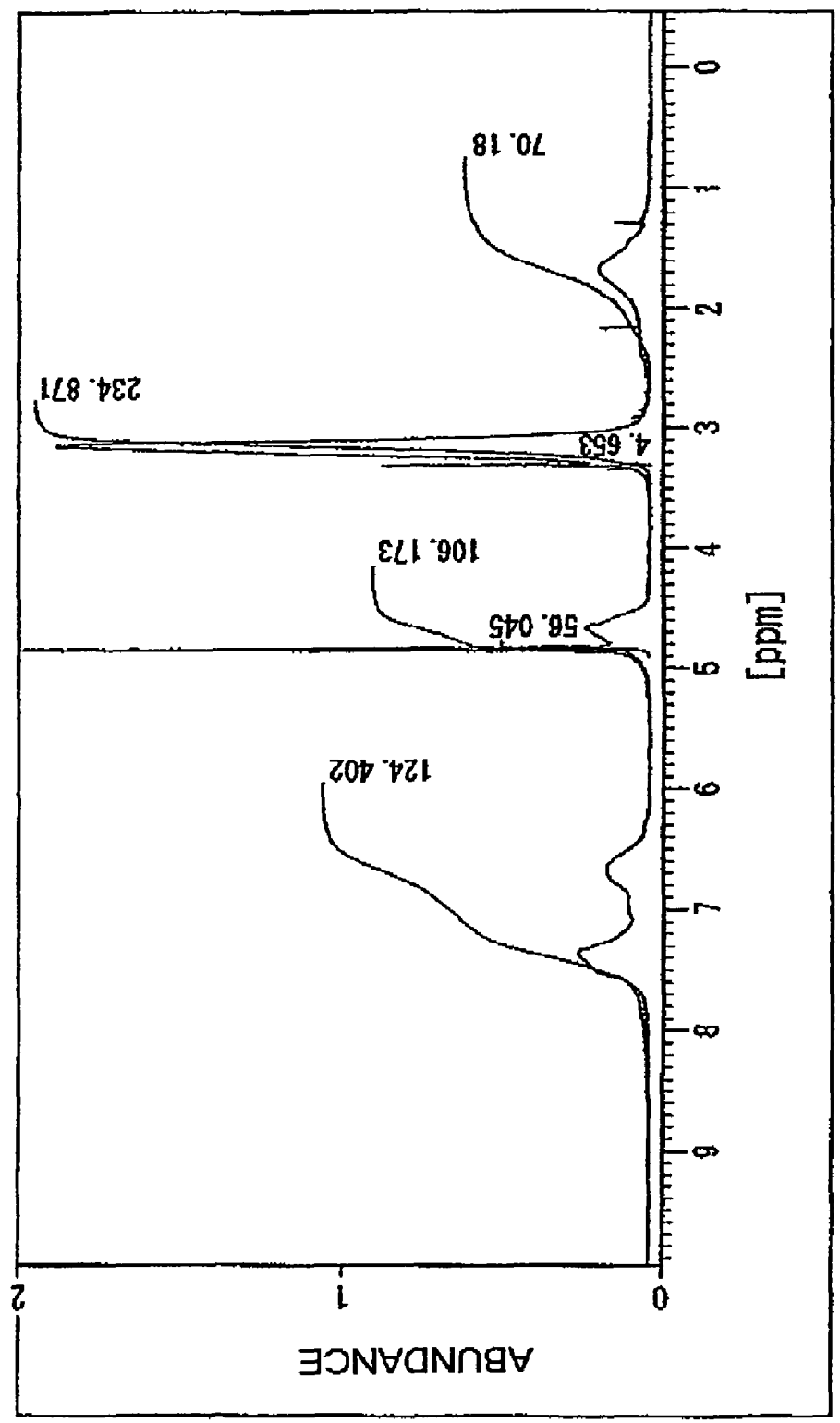
[FIG. 3]

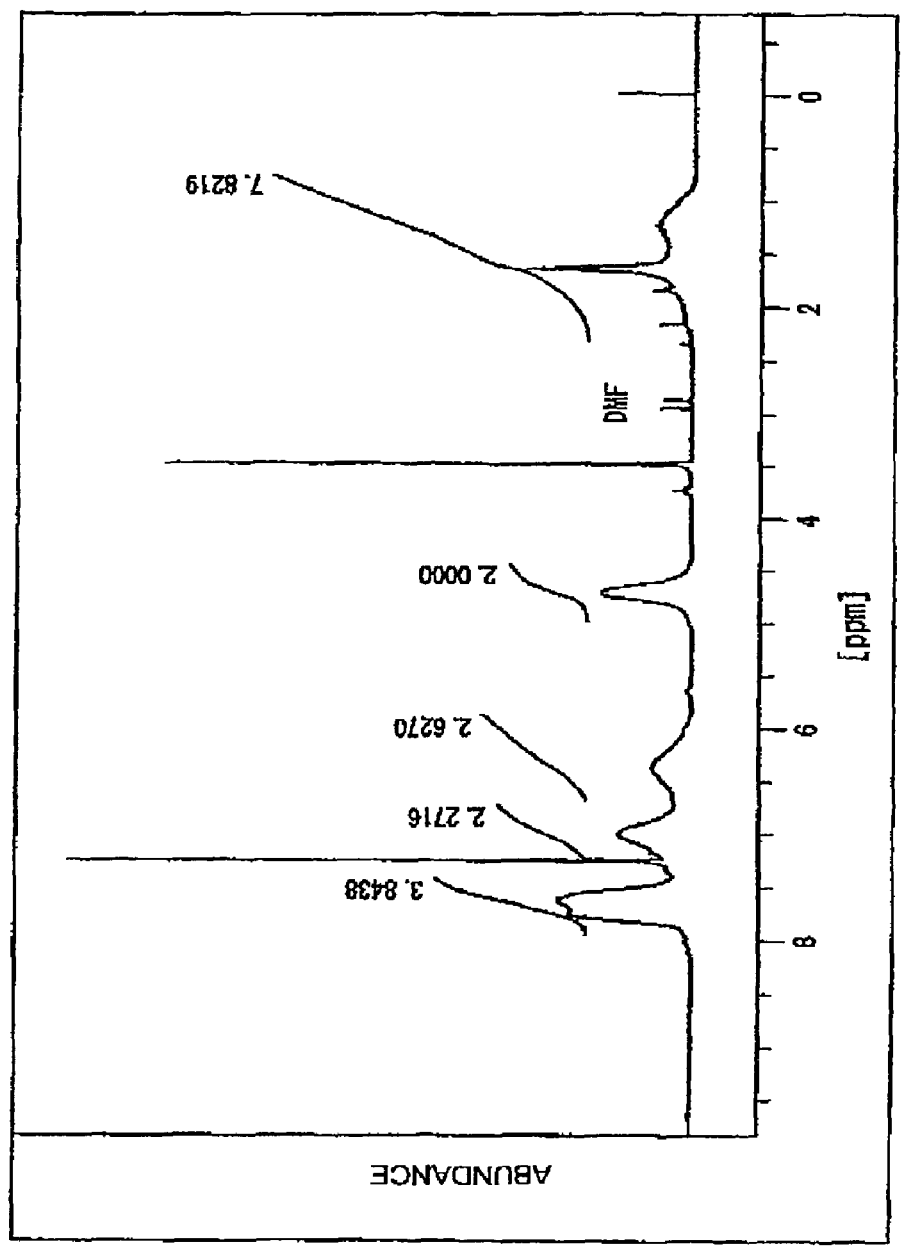
[FIG. 4]

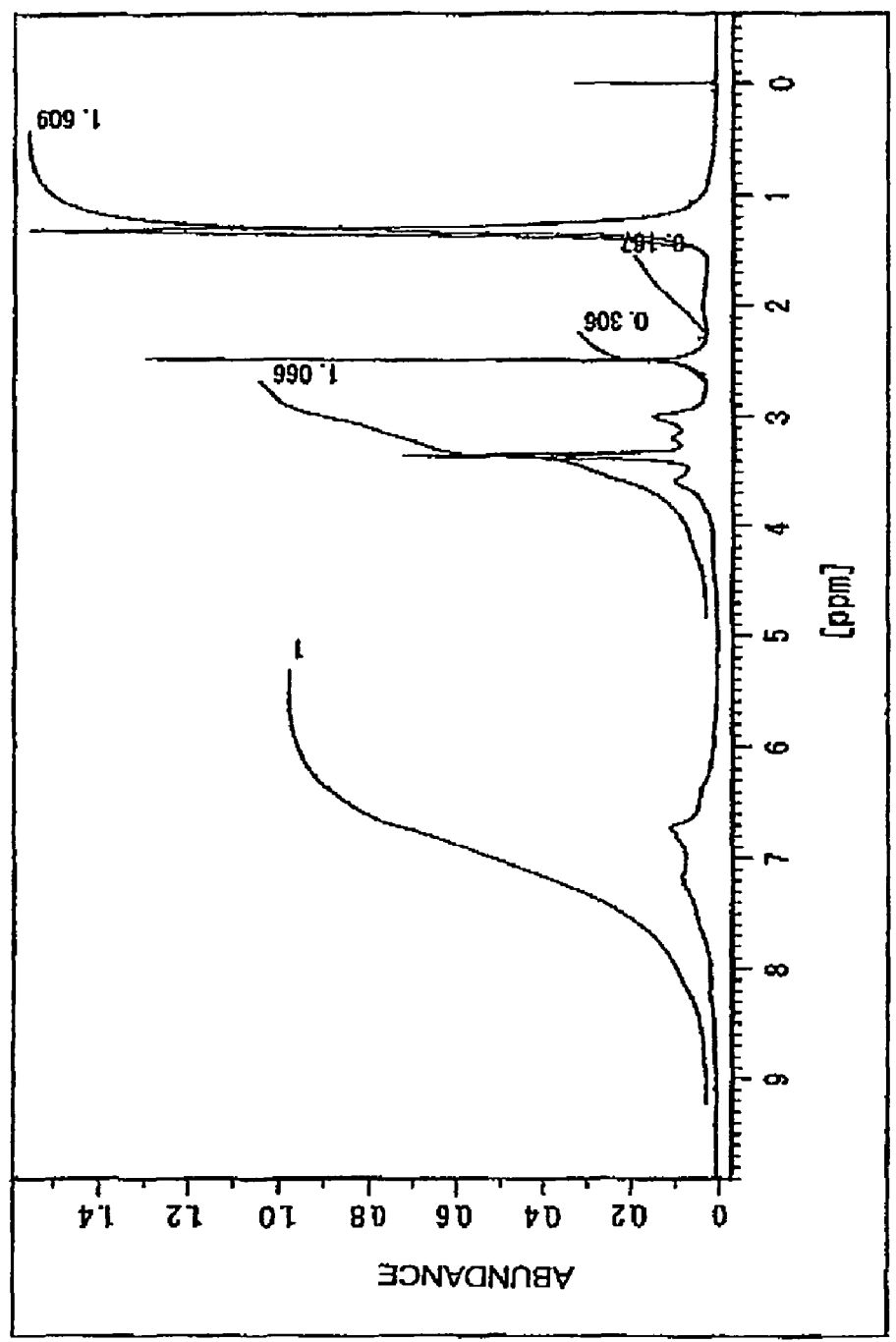
[FIG. 5]

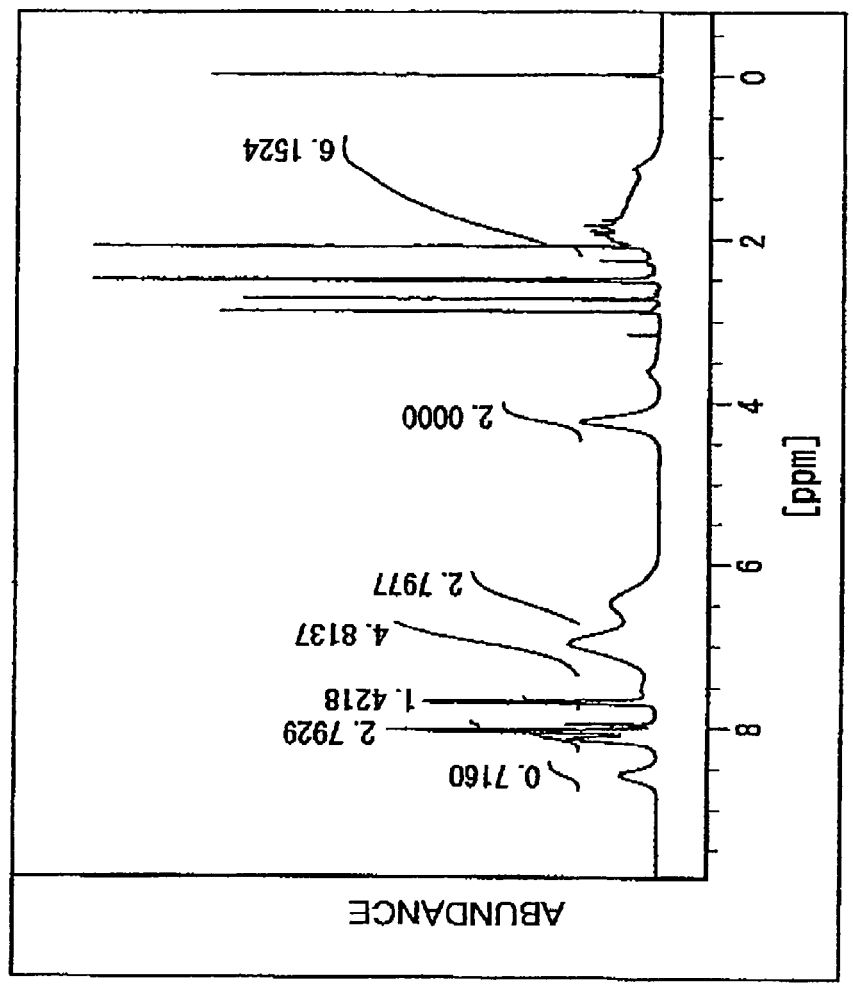

HYPERBRANCHED POLYMER AND METHOD FOR PRODUCING THE SAME

TECHNICAL FIELD

The present invention relates to a novel hyperbranched polymer and method for producing the same. In other words, the hyperbranched polymer of the present invention has such characteristics as being optically stable. These hyperbranched polymers are preferably utilized as paints, inks, adhesives, resin fillers, various molding materials, nanometer pore forming agents, chemical and mechanical abrasives, supporting materials for functional substances, nanocapsules, photonic crystals, resist materials, optical materials, electronic materials, information recording materials, printing materials, battery materials, medical materials, magnetic materials, intermediate raw materials, and the like.

BACKGROUND ART

Hyperbranched polymers are classified as dendritic polymers together with dendrimers. While related-art polymers generally have a string form, these dendritic polymers have a highly branched structure. Accordingly, these dendritic polymers have various characteristics in such respects as a respect of having a specific structure, a respect of having a nanometer size, a respect of being capable of forming surfaces retaining many functional groups, a respect of being rendered having a low viscosity compared to linear polymers, a respect of exhibiting a behavior like fine particles with little entanglement between molecules, and a respect of being capable of becoming amorphous with their solubility in a solvent controllable, so that expectations lie in practical applications utilizing these characteristics.

Particularly, it is the most remarkable characteristic of dentritic polymers to have a large number of terminal groups. The more the molecular weight is, the more the number of branched chains increases, so that the absolute number of terminal groups becomes larger as the molecular weight of dendritic polymers increases. In such a dendritic polymer having a large number of terminal groups, intermolecular interactions depend largely on the types of the terminal groups, resulting in variations in its glass transition temperature, solubility, thin film forming properties, or the like. Accordingly, such a dendritic polymer has characteristics which no general linear polymer has. Further, to such a dendritic polymer, reactive functional groups can be added as terminal groups with an extremely high density, so that its applications as, for example, a high sensitive scavenger for functional substances, a high sensitive multifunctional crosslinking agent, a dispersant for metals or metal oxides, or a coating agent are expected. Accordingly, in dendritic polymers, it becomes an important factor for the exhibition of characteristics of the polymer how the type of the terminal group is selected.

An advantage of the hyperbranched polymer over the dendrimer is in its simplicity for synthesis, which is advantageous particularly in an industrial production. Generally, while the dendrimer is synthesized by repeating protection and deprotection, the hyperbranched polymer is synthesized by a one-step polymerization of a so-called $AB_x$ type monomer having in one molecule thereof, a total of three or more substituents of two types.

As a synthesis method thereof, a method for synthesizing a hyperbranched polymer by a living radical polymerization of a compound having a vinyl group while having a photo-polymerization initiating ability, is known. For example, a synthesis method of a hyperbranched polymer by a photo-polymerization of a styrene compound having a dithiocarbamate group (see Non-Patent Documents 1, 2 and 3), and a synthesis method of a hyperbranched polymer having a dithiocarbamate group by a photo-polymerization of an acryl compound having a dithiocarbamate group (see Non-Patent Documents 4, 5 and 6) are known.

[Non-Patent Document 1]
Koji Ishizu, Akihide Mori, Macromol. Rapid Commun. 21, 665-668 (2000)
[Non-Patent Document 2]
Koji Ishizu, Akihide Mori, Polymer International 50, 906-910 (2001)
[Non-Patent Document 3]
Koji Ishizu, Yoshihiro Ohta, Susumu Kawauchi, Macromolecules Vol. 35, No. 9, 3781-3784 (2002)
[Non-Patent Document 4]
Koji Ishizu, Takeshi Shibuya, Akihide Mori, Polymer International 51, 424-428 (2002)
[Non-Patent Document 5]
Koji Ishizu, Takeshi Shibuya, Susumu Kawauchi, Macromolecules Vol. 36, No. 10, 3505-3510 (2002)
[Non-Patent Document 6]
Koji Ishizu, Takeshi Shibuya, Jaeburn Park, Satoshi Uchida, Polymer International 53, 259-265 (2004)

DISCLOSURE OF THE INVENTION

Problems to be Solved by the Invention

However, since these hyperbranched polymers have in the molecule thereof, a dithiocarbamate group having a photo-polymerization initiating ability, they remain in a living state relative to a light and are optically unstable. In addition, for derivatizing the hyperbranched polymer such as hydroxylating or etherifying the same by an organic synthesis reaction, a dithiocarbamate group is necessary to be converted into a reactive functional group beforehand. Thus, an optically stable novel hyperbranched polymer capable of being derivatized into various compounds has been desired It is an object of the present invention to provide an optically stable novel hyperbranched polymer capable of being derivatized into various polymers by utilizing heretofore known reactions, and to provide a production method of such hyperbranched polymers.

Means for Solving the Problems

As the result of making extensive and intensive studies toward solving the above-described problems, the present invention has reached the inventions according to the following aspects.

According to a first aspect, a hyperbranched polymer represented by Formula (1):

[Chemical Formula 1]

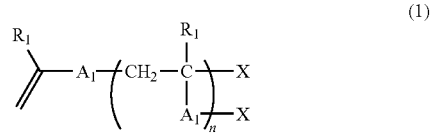

(where X represents a halogen atom; $R_1$ represents a hydrogen atom or a methyl group; $A_1$ represents a structure represented by Formula (2):

[Chemical Formula 2]

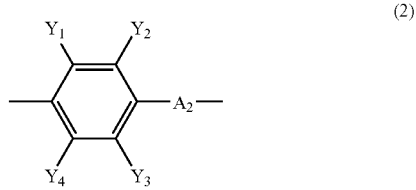

(2)

(where $A_2$ represents a linear, branched or cyclic alkylene group having 1 to 30 carbon atoms, which may contain an ether bond or an ester bond; each of $Y_1$, $Y_2$, $Y_3$ and $Y_4$ represents a hydrogen atom, an alkyl group having 1 to 20 carbon atoms, an alkoxy group having 1 to 20 carbon atoms, a nitro group, a hydroxy group, an amino group, a carboxyl group or a cyano group); and n represents the number of repeating unit structures which is an integer of 2 to 100,000)

According to a second aspect, in the hyperbranched polymer according to the first aspect, the X represents a chlorine atom, a bromine atom or an iodine atom.

According to a third aspect, in the hyperbranched polymer according to the first aspect the $A_1$ is a structure represented by Formula (3):

[Chemical Formula 3]

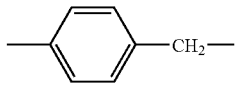

(3)

According to a fourth aspect, in the hyperbranched polymer according to the first aspect, the weight average molecular weight is 500 to 5,000,000, as measured by a gel permeation chromatography in a converted molecular weight as polystyrene.

According to a fifth aspect, a production method of a hyperbranched polymer having a halogen atom at a molecule terminal thereof includes a step for substituting a dithiocarbamate group at a molecule terminal of a hyperbranched polymer obtained by living-radical polymerizing a dithiocarbamate compound represented by Formula (4):

[Chemical Formula 4]

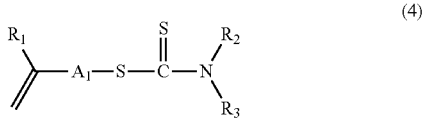

(4)

(where $R_1$ and $A_1$ represent the same as defined in Formula (1); and each of $R_2$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may form a ring together with a nitrogen atom bonded to $R_2$ and $R_3$), with a halogen atom by a halogenating agent.

According to a sixth aspect in the production method of a hyperbranched polymer according to the fifth aspect, the dithiocarbamate compound is N,N-diethyldithiocarbamylmethylstyrene.

According to a seventh aspect, in the production method of a hyperbranched polymer according to the fifth aspect, the substitution reaction is performed by reacting a hyperbranched polymer having a dithiocarbamate group at a molecule terminal thereof with a halogenating agent in an organic solvent solution containing the hyperbranched polymer having a dithiocarbamate group at a molecule terminal thereof.

According to an eighth aspect, in the production method of a hyperbranched polymer according to the fifth aspect, as the halogenating agent, at least one compound selected from chlorine, N-chlorosuccinimide, chlorinated isocyanuric acid, phosphorus trichloride, bromine, N-bromosuccinimide, N-bromoglutarimide, N,N',N"-tribromoisocyanuric acid, sodium N-bromoisocyanurate, iodine, N-iodosuccinimide, potassium iodate and periodic acid, is used.

According to a ninth aspect, in the production method of a hyperbranched polymer according to the fifth aspect, as the halogenating agent, at least one compound of bromine and N-bromosuccinimide is used.

According to a tenth aspect, a hyperbranched polymer represented by Formula (5):

[Chemical Formula 5]

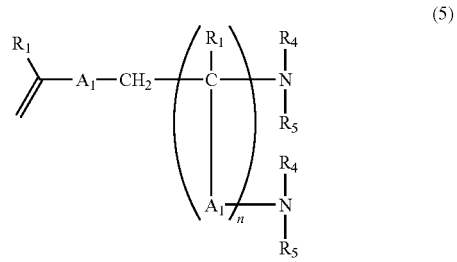

(5)

(where $R_1$ and $A_1$ represent the same as defined in Formula (1); each of $R_4$ and $R_5$ represents a hydrogen atom, a linear, branched or cyclic alkyl group having 1 to 20 carbon atoms, a hydroxyalkyl group having 1 to 5 carbon atoms, an aryl group having 6 to 14 carbon atoms, an arylalkyl group having 7 to 20 carbon atoms, an alkylaryl group having 7 to 20 carbon atoms or —$(CH_2)_m$—NH(CO)—O—$C(CH_3)_3$ (where m represents an integer of 2 to 6), or $R_4$ and $R_5$ may form a ring together with a nitrogen atom bonded to $R_4$ and $R_5$; and n represents the number of repeating unit structures which is an integer of 2 to 100,000).

According to an eleventh aspect, in the hyperbranched polymer according to the tenth aspect, which is represented by Formula (5), $R_4$ and $R_5$ represent a hydrogen atom.

According to a twelfth aspect, in the hyperbranched polymer according to the tenth aspect, which is represented by Formula (5), $R_1$, $R_4$ and $R_5$ represent a hydrogen atom and $A_1$ is a structure represented by Formula (3).

According to a thirteenth aspect, a hyperbranched polymer represented by Formula (6):

[Chemical Formula 6]

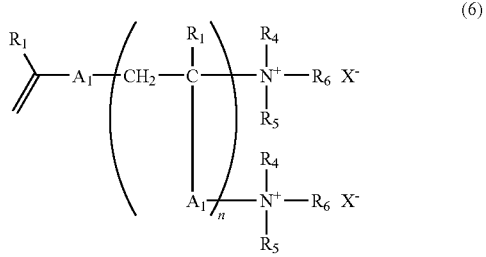

(6)

(where $R_1$ and $A_1$ represent the same as defined in Formula (1); $X^-$ represents an anion of a halogen atom; each of $R_4$, $R_5$ and $R_6$ represents a hydrogen atom, a linear, branched or cyclic alkyl group having 1 to 20 carbon atoms, a hydroxyalkyl group having 1 to 5 carbon atoms, an aryl group having 6 to 14 carbon atoms, an arylalkyl group having 7 to 20 carbon atoms, an alkylaryl group having 7 to 20 carbon atoms or —$(CH_2)_m$—NH(CO)—O—$C(CH_3)_3$ (where m represents an integer of 2 to 6), or $R_4$, $R_5$ and $R_6$ may form a ring together with a nitrogen atom bonded to $R_4$, $R_5$ and $R_6$; and n represents the number of repeating unit structures which is an integer of 2 to 100,000).

According to a fourteenth aspect, in the hyperbranched polymer according to the thirteenth aspect, which is represented by Formula (6), $R_4$, $R_5$ and $R_6$ represent a methyl group.

According to a fifteenth aspect, in the hyperbranched polymer according to the thirteenth aspect, which is represented by Formula (6), $R_1$ represents a hydrogen atom; $R_4$, $R_5$ and $R_6$ to represent a methyl group; X represents a bromine atom; and $A_r$ has a structure represented by Formula (3).

According to a sixteenth aspect, in the hyperbranched polymer according to the tenth aspect to the fifteenth aspect, the weight average molecular weight is 500 to 5,000,000, as measured by a gel permeation chromatography in a converted molecular weight as polystyrene.

According to a seventeenth aspect, a production method of the hyperbranched polymer according to the tenth aspect or the thirteenth aspect, includes a step for reacting the hyperbranched polymer represented by Formula (1) having a halogen atom at a molecule terminal thereof with an amine compound in the presence of a base in water and/or an organic solvent solution.

According to an eighteenth aspect, a production method of the hyperbranched polymer according to the eleventh aspect, includes: a first step for reacting the hyperbranched polymer represented by Formula (1) having a halogen atom at a molecule terminal thereof with phthalimide in the presence of a base in water and/or an organic solvent solution to convert the molecule terminal to a phthalimide group; and a second step for further hydrolyzing the hyperbranched polymer having the phthalimide group with a hydrazine compound to convert it to a hyperbranched polymer in which the molecule terminal:

[Chemical Formula 7]

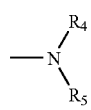

in Formula (5) represents —$NH_2$.

Effects of the Invention

The hyperbranched polymer having a halogen atom which is a reactive functional group at a molecule terminal thereof according to the present invention is an optically stable novel hyperbranched polymer. Further, from the hyperbranched polymer, a hyperbranched polymer derivatized utilizing heretofore known reactions can be obtained. In addition, according to the production method of the present invention, a hyperbranched polymer having these characteristics can be simply and efficiently obtained.

As an example of the derivatized hyperbranched polymer, a hyperbranched polymer in which a molecule terminal thereof is derivatized to an amino group or an ammonium group is provided. A hyperbranched polymer having an ammonium group at a molecule terminal thereof is soluble in water and an alcohol solvent such as methanol and ethanol and is useful as a hydrophilic treating agent for a glass substrate. In addition, by aminating the molecule terminal, a hyperbranched polymer can be derivatized to various functional hyperbranched polymers capable of being reacted with acids containing carboxyl group or the like, so that further derivatizations are expected.

BEST MODES FOR CARRYING OUT THE INVENTION

The hyperbranched polymer of the present invention having a halogen atom at a molecule terminal thereof has a structure represented by Formula (1). In Formula (1), X represents a halogen atom. $R_1$ represents a hydrogen atom or a methyl group. n represents the number of repeating unit structures which is an integer of 2 to 100,000. In addition, $A_1$ represents a structure represented by Formula (2).

In Formula (2), $A_2$ represents a linear, branched or cyclic alkylene group having 1 to 30 carbon atoms which may contain an ether bond or an ester bond; each of $Y_1$, $Y_2$, $Y_3$ and $Y_4$ represents a hydrogen atom, an alkyl group having 1 to 20 carbon atoms, an alkoxy group having 1 to 20 carbon atoms, a nitro group, a hydroxy group, an amino group, a carboxyl group or a cyano group.

Specific examples of the alkylene group of $A_2$ include a linear alkylene group such as a methylene group, an ethylene group, an n-propylene group, an n-butylene group and an n-hexylene group; and a branched alkylene group such as an isopropylene group, an isobutylene group and a 2-methylpropylene group. In addition, examples of the cyclic alkylene group include an alicyclic aliphatic group having a monocyclic, polycyclic and crosslinked cyclic structure having 3 to 30 carbon atoms. Specific examples thereof can include groups having a monocyclo, bicyclo, tricyclo, tetracyclo or pentacyclo structure having 4 or more carbon atoms. For example, structural examples (a) to (s) of the alicyclic part in the alicyclic aliphatic group are shown as follows.

[Chemical Formula 8]

(a)

(b)

(c)

(d)
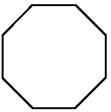

(e)

(f)
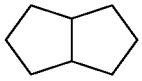

(g) 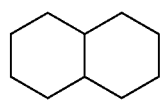

(h) 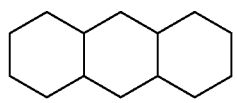

(i) 

(j) 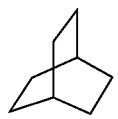

(k) 

(l) 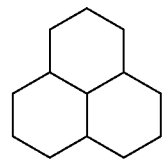

(m) 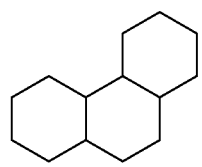

(n) 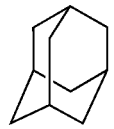

(o) 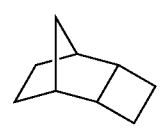

(p) 

(q) 

(r) 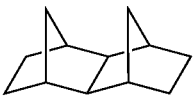

(s) 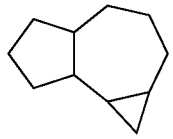

Examples of the alkyl group having 1 to 20 carbon atoms of $Y_1, Y_2, Y_3$ and $Y_4$ include a methyl group, an ethyl group, an isopropyl group, a cyclohexyl group and an n-pentyl group. Examples of the alkoxy group having 1 to 20 carbon atoms include a methoxy group, an ethoxy group, an isopropoxy group, a cyclohexyloxy group and an n-pentyloxy group. Preferred examples of $Y_1, Y_2, Y_3$ and $Y_4$ include a hydrogen atom or an alkyl group having 1 to 20 carbon atoms.

In addition, $A_1$ in Formula (1) represents preferably a structure represented by Formula (3).

Next, the structure of the hyperbranched polymer of the present invention having a halogen atom at a molecule terminal thereof is described.

The hyperbranched polymer of the present invention having a structure represented by Formula (1) takes a structure in which to a structure at an initiation site having a vinyl group and represented by Formula (7), a repeating unit structure represented by Formula (8) is coupled.

[Chemical Formula 9]

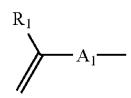 (7)

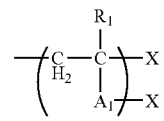 (8)

($R_1$, $A_1$ and X in Formulae (7) and (8) represent the same as defined in Formula (1).)

Then, when n representing the number of repeating unit structures is 2, as the structure, Formulae (9) and (10):

[Chemical Formula 10]

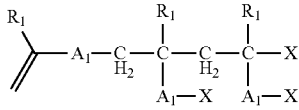 (9)

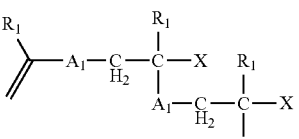 (10)

($R_1$, $A_1$ and X in Formulae (9) and (10) represent the same as defined in Formula (1).) can be expected.

When n representing the number of repeating unit structures is 3, one of halogen atoms of the terminals represented by Formulae (9) and (10) becomes Formula (8) and as the structure thereof, Formulae (11) to (15) can be expected.

[Chemical Formula 11]

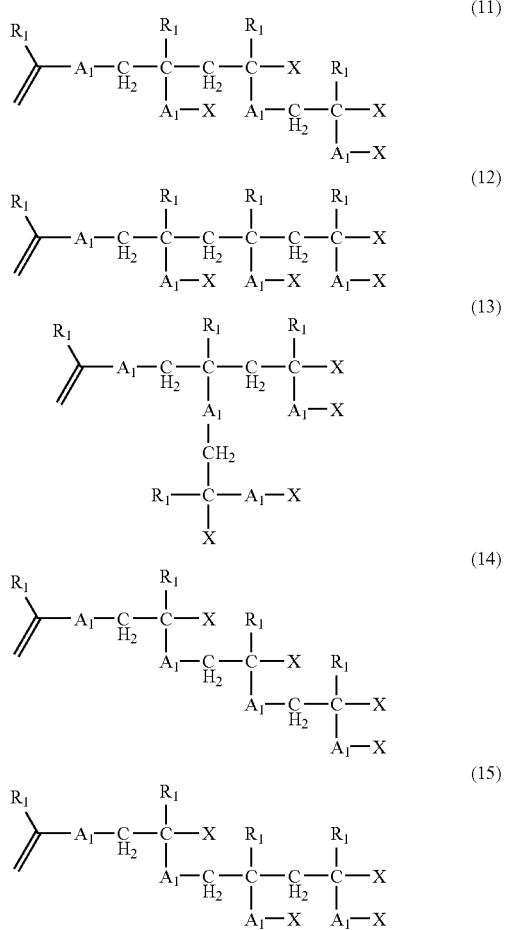

When n representing the number of repeating unit structures is 4 or more, many more structures can be expected.

The hyperbranched polymer of the present invention having a structure represented by Formula (1) encompasses any of hyperbranched polymers in which repeating unit structures are regularly bonded at three points and branched structures are formed, and hyperbranched polymers in which repeating unit structures are bonded at two points and no branched structure is formed, but linear structures are formed.

The hyperbranched polymer of the present invention can be considered to contain a single repeating unit structure or two or more repeating unit structures and it may be any of these cases. Then, for example when the hyperbranched polymer contains two types of repeating unit structures, that is the hyperbranched polymer is a copolymer, the sequence pattern of the copolymer may be any of random copolymer, alternating copolymer or block copolymer.

The hyperbranched polymer of the present invention has a weight average molecular weight Mw, measured by a gel permeation chromatography in a converted molecular weight as polystyrene, of 500 to 5,000,000, preferably 1,000 to 1,000,000, more preferably 2,000 to 500,000, most preferably 3,000 to 100,000. The degree of dispersion which is a ratio of Mw (weight average molecular weight)/Mn (number average molecular weight) of the hyperbranched polymer is 1.0 to 7.0, preferably 1.1 to 6.0, more preferably 1.2 to 5.0.

Next, the production method of the hyperbranched polymer of the present invention having a structure represented by Formula (1) is described.

The hyperbranched polymer of the present invention having a structure represented by Formula (1) can be produced by halogenating a hyperbranched polymer having a dithiocarbamate group at a molecule terminal thereof which is obtained by living-radical polymerizing a dithiocarbamate compound represented by Formula (4), as a hyperbranched polymer having a halogen atom at the molecule terminal thereof.

In Formula (4), $R_1$ and $A_1$ represent the same as defined in Formula (1). Each of $R_2$ and $R_3$ represents an alkyl group having 1 to 5 carbon atoms, a hydroxyalkyl group having 1 to 5 carbon atoms or an arylalkyl group having 7 to 12 carbon atoms. In addition $R_2$ and $R_3$ can be bonded to each other to form a ring together with a nitrogen atom bonded to $R_2$ and $R_3$.

Examples of the alkyl group having 1 to 5 carbon atoms include a methyl group, an ethyl group, an isopropyl group, a t-butyl group, a cyclopentyl group and an n-pentyl group. Examples of the hydroxyalkyl group having 1 to 5 carbon atoms include a hydroxymethyl group, a hydroxyethyl group and a hydroxypropyl group. Examples of the arylalkyl group having 7 to 12 carbon atoms include a benzyl group and a phenethyl group.

Examples of the ring formed with $R_2$ and $R_3$ which are bonded to each other together with a nitrogen atom bonded to $R_2$ and $R_3$ include a 4- to 8-membered ring; a ring containing 4 to 6 methylene groups in the ring; and a ring containing an oxygen atom or a sulfur atom and 4 to 6 methylene groups. Specific examples of the ring formed with $R_2$ and $R_3$ which are bonded to each other together with a nitrogen atom bonded to $R_2$ and $R_3$ include a piperizine ring, a pyrrolidine ring, a morpholine ring, a thiomorpholine ring and a homopiperizine ring.

The compound represented by Formula (4) can be easily obtained according to a nucleophilic substitution reaction between a compound represented by following Formula (16) and a compound represented by following Formula (17).

[Chemical Formula 12]

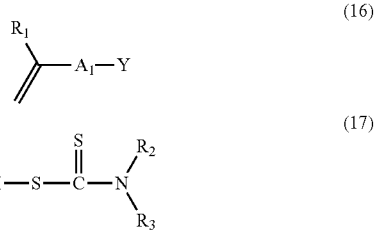

In Formula (16), Y represents a leaving group. Examples of the leaving group include a fluorine atom, a chlorine atom, a bromine atom, an iodine atom, a mesyl group and a tosyl group. In Formula (17), M represents lithium, sodium or potassium.

It is preferred that the nucleophilic substitution reaction is usually performed in an organic solvent capable of dissolving both the above two types of compounds. After the completion of the reaction, by performing a liquid separation treatment using water/nonaqueous organic solvent and a recrystallization treatment, the compound represented by Formula (4) can be obtained in a high purity. In addition, the compound represented by Formula (4) can be produced referring to the methods described in Macromol. Rapid Commun. 21, 665-668 (2000) or Polymer International 51, 424-428 (2002).

Specific examples of the compound represented by Formula (4) include N,N-diethyldithiocarbamylmethylstyrene.

Then, by living-radical polymerizing the compound represented by Formula (4), a hyperbranched polymer having a dithiocarbamate group at a molecule terminal thereof can be obtained. The living-radical polymerization of the compound represented by Formula (4) can be performed by a heretofore known polymerization method such as a bulk polymerization, a solution polymerization, a suspension polymerization and an emulsion polymerization. Among these polymerization methods, the solution polymerization is preferred.

In the case of the solution polymerization, the compound represented by Formula (4) can be polymerized in any concentration thereof in a solvent capable of dissolving this compound. Though the concentration of the compound represented by Formula (4) is arbitral, for example, it is 1 to 80% by mass, preferably 2 to 70% by mass, more preferably 5 to 60% by mass, most preferably 30 to 50%4 by mass. The solvent is not particularly limited so long as it is a solvent capable of dissolving the compound represented by Formula (4). Examples of the solvent include: aromatic hydrocarbons such as benzene, toluene, xylene and ethyl benzene; ether compounds such as tetrahydrofuran and diethyl ether; ketone compounds such as acetone, methyl ethyl ketone, methyl isobutyl ketone and cyclohexanone; and aliphatic hydrocarbons such as n-heptane, n-hexane and cyclohexane. These solvents may be used individually or in combination of two or more types thereof.

The living-radical polymerization of the compound represented by Formula (4) can be performed in a solvent by heating or irradiating a light such as an ultraviolet ray. Then, the polymerization is preferably performed by irradiating a light such as an ultraviolet ray. In the living-radical polymerization, it is necessary that before the initiation of the polymerization, oxygen in the reaction system is fully purged and the inside of the system is preferably replaced with an inert gas such as nitrogen and argon. The polymerization time is, for example, 0.1 to 100 hours, preferably 1 to 50 hours, more preferably 3 to 30 hours. Generally, according to the time course of the polymerization, the conversion ratio of the monomer (the compound represented by Formula (4)) is increased. The polymerization temperature is not particularly limited. However, it is, for example, 0 to 200° C., preferably 10 to 150° C., more preferably 20 to 100° C.

The living-radical polymerization of the compound represented by Formula (4) can also be performed referring to a method described in Macromolecules Vol. 35, No. 9, 3781-3784 (2002) or in Macromolecules Vol. 36, No. 10, 3505-3510 (2002).

By living-radical polymerizing the dithiocarbamate compound represented by Formula (4), a hyperbranched polymer having a dithiocarbamate group at a molecule terminal thereof can be obtained. The hyperbranched polymer having a dithiocarbamate group at a molecule terminal thereof is considered to be formed as follows. That is, by irradiating a light or the like to the compound represented by Formula (4), an $A_1$—S bond is cleaved to generate a radical species (Formula (18)). Next, the radical species represented by Formula (18) is reacted with the compound represented by Formula (4) to generate a compound represented by Formula (19). Further, in Formula (19), a C—S bond or an $A_1$—S bond is cleaved to generate radical species which are reacted with the compound represented by Formula (4) to give a compound represented by Formula (20) or (21). Here, in Formulae (20) and (21), DC represents a dithiocarbamate group (—SC(=S)N($R_2$)$R_3$). Then, by repeating similar reactions from the compound represented by Formula (20) or (21), the hyperbranched polymer having a dithiocarbamate group at a molecule terminal thereof is considered to be formed.

[Chemical Formula 13]

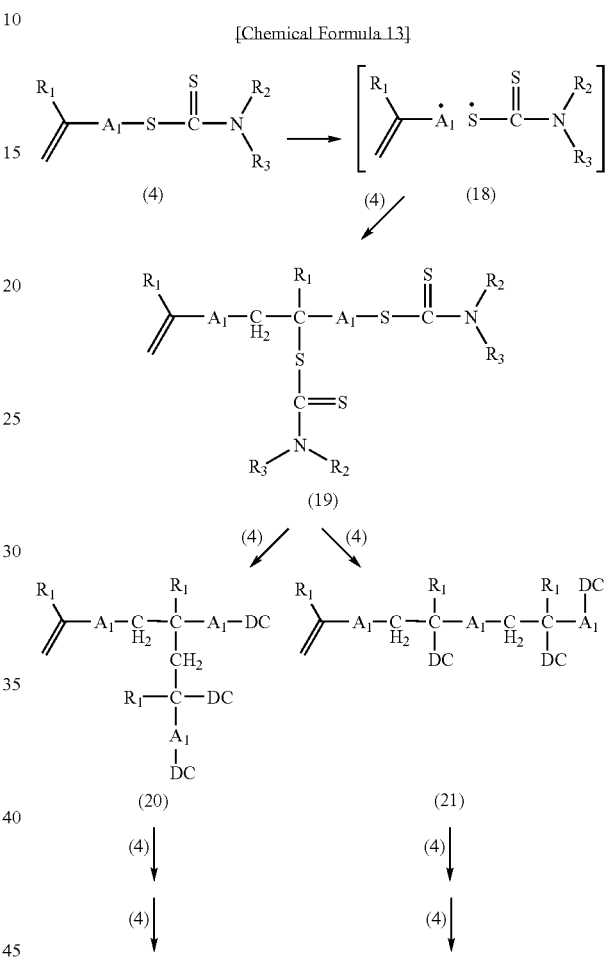

During the living-radical polymerization, for controlling the molecular weight and the molecular weight distribution, a chain transfer agent such as mercaptans and sulfides or sulfide compounds such as tetraethylthiuram disulfide can be used. Further, if desired, anti-oxidants such as hindered phenols, ultraviolet rays absorbing agents such as benzotriazoles, polymerization inhibitors such as 4-tert-butylcathecol, hydroquinone, nitrophenol, nitrocresol, picric acid, phenothiazine and dithiobenzoyl disulfide can be used.

In addition, during the living-radical polymerization, for controlling the degree of branching and the degree of the polymerization, heretofore known vinyl monomers having no dithiocarbamate group or compounds having unsaturated double bonds can be added. These compound can be used in a ratio of less than 50 mol % relative to the compound represented by Formula (4). Specific examples of these compounds include styrenes, vinylbiphenyls, vinylnaphthalenes, vinylanthracenes, acrylic esters, methacrylic esters, acrylamides, methacrylamides, vinylpyrrolidones, acrylonitriles, maleic acids, maleimides, divinyl compounds and trivinyl compounds.

Next, the production method of the hyperbranched polymer having a halogen atom at a molecule terminal thereof is described in detail.

By substituting the hyperbranched polymer having a dithiocarbamate group at a molecule terminal thereof obtained as described above with a halogen atom, the hyperbranched polymer of the present invention represented by Formula (1) having a halogen atom at a molecule terminal thereof can be obtained.

[Chemical Formula 14]

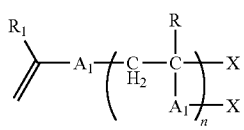

(1)

The halogenation method is not particularly limited so long as the method is capable of replacing a dithiocarbamate group with a halogen atom. Examples of the halogenating agent capable of being used in this reaction include chlorinating agents such as chlorine, N-chlorosuccinimide, chlorinated isocyanuric acid, sulfuryl chloride, t-butyl hypochloride, phosphorus trichloride, phosphorus pentachloride, triphenylphosphine dichloride, cupric chloride and antimony pentachloride; brominating agents such as bromine, N-bromosuccinimide, N-bromoglutarimide, N,N',N"-tribromoisocyanuric acid, sodium N,N'-dibromoisocyanurate, potassium N,N'-bromoisocyanurate, N,N'-dibromoisocyanuric acid, sodium N-bromoisocyanurate, N,N'-dibromohydantoin, potassium N-bromohydantoin, sodium N,N'-bromohydantoin, N-bromo-N'-methylhydantoin, 1,3-dibromo-5,5'-dimethylhydantoin, 3-bromo-5,5'-dimethylhydantoin, sodium 1-bromo-5,5'-dimethylhydantoin, potassium 1-bromo-5,5'-dimethylhydantoin, sodium 3-bromo-5,5'-dimethylhydantoin and potassium 3-bromo-5,5'-dimethylhydantoin; and iodinating agents such as iodine, N-iodosuccinimide, potassium iodate, potassium periodate, periodic acid and iodic acid. The used amount of the halogenating agent may be 1 to 20 times molar equivalent, preferably 1.5 to 15 times molar equivalent, more preferably 2 to 10 times molar equivalent relative to the number of dithiocarbamate groups in the hyperbranched polymer. The conditions of the substitution reaction are appropriately selected from reaction times of 0.01 to 100 hours and reaction temperatures of 0 to 300° C. Preferably, the reaction time is 0.1 to 10 hours and the reaction temperature is 20 to 150° C.

The reaction in which the dithiocarbamate group at the molecule terminal is substituted with a halogen atom is preferably performed in water or an organic solvent. The solvent to be used is preferably a solvent capable of dissolving the hyperbranched polymer having the dithiocarbamate group and the halogenating agent. In addition, when the solvent is the same solvent as that used during the production of the hyperbranched polymer having a dithiocarbamate group, the reaction operation becomes simple, which is preferred.

As the halogenating method, preferred is a reaction performed by heating to reflux in an organic solvent solution using a halogenating agent such as bromine. The organic solvent may be any one so long as it does not significantly hinder the progression of the reaction and specific examples thereof which can be used include: organic acid solvents such as acetic acid; aromatic hydrocarbons such as benzene, toluene, xylene, ethylbenzene and 1,2-dichlorobenzene; ether compounds such as tetrahydrofuran and diethyl ether; ketone compounds such as acetone, methyl ethyl ketone, methyl isobutyl ketone and cyclohexanone; and aliphatic hydrocarbons such as chloroform, dichloromethane, 1,2-dichloroethane, n-heptane, n-hexane and cyclohexane. These solvents may be used individually or in combination of two or more types thereof. Also, the organic solvent is preferably used in an amount of 0.2 to 1,000 times mass, preferably 1 to 500 times mass, more preferably 5 to 100 times mass, most preferably 10 to 50 times mass relative to the mass of the hyperbranched polymer having a dithiocarbamate group at a molecule terminal thereof. In addition, in this reaction, it is necessary that before the reaction, oxygen in the reaction system is fully purged and the inside of the system is preferably replaced with an inert gas such as nitrogen and argon. The reaction conditions are appropriately selected from reaction times of 0.01 to 100 hours and from reaction temperatures of 0 to 200° C. Preferably the reaction time is 0.1 to 5 hours and the reaction temperature is 20 to 150° C.

After the completion of the reaction, a halogenating agent remained within the reaction system is desirably decomposition-treated and at this time, there can be used an aqueous solution of a reducing agent such as sodium thiosulfate and sodium sulfite, or an aqueous solution of an alkali such as sodium hydroxide, potassium hydroxide and calcium hydroxide. In addition, the remained halogenating agent may be reacted with a compound containing unsaturated bonds such as ethylene, propylene, butene, cyclohexene. The used amount of such a compound may be 0.1 to 50 equivalents, preferably 0.5 to 10 equivalents, more preferably 1 to 3 equivalents relative to the amount of the used halogenating agent. The hyperbranched polymer of the present invention having a halogen atom at a molecule terminal thereof and obtained by the above-described halogenating reaction can be separated from the solvent out of the reaction solution by distilling-off the solvent or by solid-liquid separation. Also, by adding the reaction solution to a poor solvent, the hyperbranched polymer of the present invention having a halogen atom at a molecule terminal thereof can be precipitated to be recovered as a powder.

In addition, in the hyperbranched polymer of the present invention having a halogen atom at the molecule terminal thereof, a part of the molecule terminal may be remained as a dithiocarbamate group.

Next, a hyperbranched polymer having a structure represented by Formula (5) having an amino group at the molecule terminal or by Formula (6) having an ammonium group at the molecule terminal is described in detail.

[Chemical Formula 15]

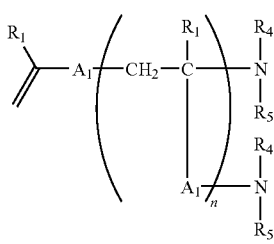

(5)

-continued

[Chemical Formula 16]

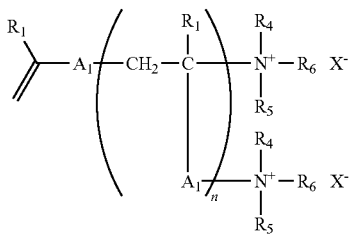

(6)

In Formula (5) or (6), $R_1$ represents a hydrogen atom or a methyl group. In addition, in Formula (5) or (6), $A_1$ represent a structure represented by Formula (2):

[Chemical Formula 17]

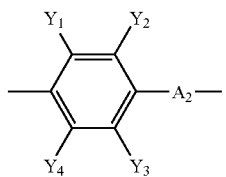

(2)

(where $A_2$ represents a linear, branched or cyclic alkylene group having 1 to 30 carbon atoms which may contain an ether bond or an ester bond; each of $Y_1, Y_2, Y_3$ and $Y_4$ represents a hydrogen atom, an alkyl group having 1 to 20 carbon atoms or an alkoxy group having 1 to 20 carbon atoms, a nitro group, a hydroxy group, an amino group, a carboxyl group or a cyano group). In addition, in Formula (5) or (6), each of $R_4$, $R_5$ and $R_6$ represents a hydrogen atom, a linear, branched or cyclic alkyl group having 1 to 20 carbon atoms, a hydroxyalkyl group having 1 to 5 carbon atoms, an aryl group having 6 to 14 carbon atoms, an arylalkyl group having 7 to 20 carbon atoms, an alkylaryl group having 7 to 20 carbon atoms or —$(CH_2)_n$—NH(CO)—O—C(CH$_3$)$_3$ (where n represents an integer of 2 to 6). In addition, $R_4$ and $R_5$ may be bonded to each other to form a ring together with a nitrogen atom bonded to $R_4$ and $R_5$. In addition, in Formula (5) or (6), n repents the number of repeating unit structures which is an integer of 2 to 100,000. In addition, in Formula (6), X⁻ represents an anion of a halogen atom.

Examples of the linear alkyl group having 1 to 20 carbon atoms represented by $R_4$, $R_5$ and $R_6$ include a methyl group, an ethyl group, an n-propyl group, an n-butyl group, an n-pentyl group, an n-hexyl group, a heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group and an n-eicosyl group. Examples of the branched alkyl group include an isopropyl group, an isobutyl group, a sec-butyl group and a tert-butyl group. Examples of the cyclic alkyl group include a group having a cyclopentyl ring or cyclohexyl ring structure.

Examples of the hydroxyalkyl group having 1 to 5 carbon atoms include a hydroxymethyl group, a hydroxyethyl group and a hydroxypropyl group. Examples of the aryl group having 6 to 14 carbon atoms include a phenyl group, a biphenyl group, a naphthyl group, an anthraquino group, an anthracene group, a fluorene group, a fluorenone group, an indan group, a phenanthrene group and a quinoline group. Examples of the arylalkyl group having 7 to 20 carbon atoms include a benzyl group and a phenethyl group. Examples of the alkylaryl group having 7 to 20 carbon atoms include a p-n-butylphenyl group, a p-tert-butylphenyl group, a p-n-octylphenyl group, a p-n-decylphenyl group, a p-n-dodecylaniline group and a p-n-tetradecylphenyl group.

In addition, examples of the ring formed with $R_4$ and $R_5$ which are bonded to each other together with a nitrogen atom bonded to $R_4$ and $R_5$ in the structure represented by Formula (5) include a phthalimide group, a pyrrole ring, a piperidine ring, a piperazine ring and an imidazole ring.

Further, examples of the ring formed with $R_4$, $R_5$ and $R_6$ which are bonded to each other together with a nitrogen atom bonded to $R_4$, $R_5$ and $R_6$ in the structure represented by Formula (6) include a pyridine ring, a pyrimidine ring, a pyrazine ring, a quinoline ring and a pipiridyl ring. In addition, examples of the halogen atom in Formula (6) include a chlorine atom, a bromine atom and an iodine atom.

The hyperbranched polymer having a structure represented by Formula (5) having an amino group at a molecule terminal or by Formula (6) having an ammonium group at a molecule terminal can be obtained by reacting a hyperbranched polymer having a halogen atom at a molecule terminal thereof with an amine compound.

Accordingly, the hyperbranched polymer having a structure represented by Formula (5) or (6) has the same structure as that described in detail in a section of the structure of the hyperbranched polymer represented by Formula (1) having a halogen atom at a molecule terminal thereof, that is, the structure in which a halogen atom is replaced with an amino group or an ammonium group.

Examples of amine compounds capable of being used in this reaction include: primary amines, for example, aliphatic amines such as N-methylamine, N-ethylamine, N-n-propylamine, N-isopropylamine, N-n-butylamine, N-isobutylamine, N-sec-butylamine, N-tert-butylamine, N-n-pentylamine, N-n-hexylamine, N-n-heptylamine, N-n-octylamine, N-n-nonylamine, N-n-decylamine, N-n-undecylamine, N-n-dodecylamine, N-n-tridecylamine, N-n-tetradecylamine, N-n-pentadecylamine, N-n-hexadecylamine, N-n-heptadecylamine, N-n-octadecylamine, N-n-nonadecylamine and N-n-eicosylamine; alicyclic amines such as N-cyclopentylamine and N-cyclohexylamine; aromatic amines such as anilines (such as aniline, p-n-butylaniline, p-t-butylaniline, p-n-octylaniline, p-n-decylaniline, p-n-dodecylaniline and p-n-tetradecylaniline), alkyl phenols (such as N-benzylamine and N-(2-phenylethyl) amine), naphthylamines (such as 1-naphthylamine and 2-naphthylamine), aminoanthracenes (such as 1-aminoanthracene and 2-aminoanthracene), aminoanthraquinones (such as 1-aminoanthraquinone), aminobiphenyls (such as 4-aminobiphenyl and 2-aminobiphenyl), aminofluorenones (such as 2-aminofluoreneaminofluorene, 1-amino-9-fluorenone and 4-amino-9-fluorenone), aminoindans (such as 5-aminoindan), aminoisoquinolines (such as 5-aminoisoquinoline) and aminophenanthrenes (such as 9-aminophenanthrene); and amine compounds such as N-(tert-buthoxycarbonyl)-1,2-ethylenediamine, N-(tert-buthoxycarbonyl)-1,3-propylenediamine, N-(tert-buthoxycarbonyl)-1,4-butylenediamine, N-tert-buthoxycarbonyl)-1,5-pentamethylenediamine, N-(tert-buthoxycarbonyl)-1,6-hexamethylenediamine, N-(2-hydroxyethyl) amine, N-(3-hydroxypropyl) amine, N-(2-methoxyethyl) amine and N-(2-ethoxyethyl) amine.

Examples of the above amine compounds further include: secondary amines, for example, aliphatic amines such as N,N-dimethylamine, N,N-diethylamine, N,N-di-n-propylamine, N,N-di-isopropylamine, N,N-di-n-butylamine, N,N-diisobutylamine, N,N-di-sec-butylamine, N,N-di-n-pentylamine, N-methyl-N-ethylamine, N-methyl-N-n-propylamine, N-methyl-N-n-butylamine, N-methyl-N-n-pentylamine, N-ethyl-N-isopropylamine, N-ethyl-N-n-butylamine, N-ethyl-N-n-pentylamine, N-methyl-N-n-octylamine, N-methyl-N-n-decylamine, N-methyl-N-n-dodecylamine, N-methyl-N-n-tetradecylamine, N-methyl-N-n-hexadecylamine, N-methyl-N-n-octadecylamine, N-ethyl-N-isopropylamine, N-ethyl-N-octylamine, N,N-di-n-hexylamine, N,N-dioctylamine, N,N-didodecylamine, N,N-dihexadecylamine and N,N-dioctadecylamine; alicyclic amines such as N,N-dicyclohexylamine; aromatic amines such as N,N-diphenylamine and N,N-dibenzylamine; nitrogen-containing heterocyclic compounds such as phthalimide, pyrrol, piperidine, piperazine and imidazole; and amine compounds such as N,N-di(2-hydroxyethyl)amine, N,N-di(3-hydroxypropyl)amine, N,N-di(ethoxyethyl)amine and N,N-di(propoxyethyl)amine.

Examples of the above amine compounds further include: tertiary amines, for example, aliphatic amines such as trimethylamine, triethylamine, tripropylamine, tributylamine, tripentylamine, N,N-dimethyl-N-octylamine, N,N-diethyl-N-n-decylamine, N,N-dimethyl-N-n-dodecylamine, N,N-dimethyl-N-n-tetradecylamine, N,N-dimethyl-N-n-hexadecylamine, N,N-dimethyl-N-n-octadecylamine, N,N-dimethyl-N-n-eicosylamine and N,N-dimethyl-N-n-dodecylamine; and nitrogen-containing heterocyclic compounds such as pyridine, pyrazine, pyrimidine, quinoline, 1-methylimidazole, 4,4'-pipiridyl and 4-methyl-4,4'-pipiridyl.

The used amount of the amine compound capable of being used in the above-described reaction may be 0.1 to 20 times molar equivalent, preferably 0.5 to 10 times molar equivalent, more preferably 1 to 5 times molar equivalent relative to 1 molar equivalent of the halogen atom in the hyperbranched polymer having a halogen atom at a molecule terminal thereof. The conditions for the reaction are appropriately selected from reaction times of 0.01 to 100 hours and reaction temperatures of 0 to 300° C. Preferably, the reaction time is 0.1 to 10 hours and the reaction temperature is 20 to 150° C.

The reaction of the halogen atom at a molecule terminal with the amine compound can be performed in water or an organic solvent solution in the presence or absence of a base. The solvent to be used is preferably those capable of dissolving the above hyperbranched polymer having a halogen atom and the amine compound. Further, when the solvent is a solvent capable of dissolving the above hyperbranched polymer having a halogen atom and the amine compound and incapable of dissolving a hyperbranched polymer having an amino group or an ammonium group at a molecule terminal thereof, the isolation of the hyperbranched polymer having an amino group or an ammonium group at a molecule terminal thereof becomes easy, which is more preferred.

The organic solvent may be any one so long as it does not significantly hinder the progression of the present reaction and examples thereof which can be used include: water; organic acid solvents such as acetic acid; aromatic hydrocarbons such as benzene, toluene, xylene, ethylbenzene and 1,2-dichlorobenzene; ether compounds such as tetrahydrofuran and diethyl ether; ketone compounds such as acetone, methyl ethyl ketone, methyl isobutyl ketone and cyclohexanone; and aliphatic hydrocarbons such as chloroform, dichloromethane, 1,2-dichloroethane, n-heptane, n-hexane, cyclohexane, dimethylformamide, dimethylacetoamide and N-methylpyrrolidone. These solvents may be used individually or in combination of two or more types thereof. Also, an organic solvent is used preferably in an amount of 0.2 to 1,000 times mass, preferably 1 to 500 times mass, more preferably 5 to 100 times mass, most preferably 10 to 50 times mass relative to the mass of the hyperbranched polymer having a halogen atom at a molecule terminal thereof. Further, in this reaction, it is necessary that before the initiation of the reactions oxygen in the reaction system is fully purged and the inside of the system is preferably replaced with an inert gas such as nitrogen and argon. The reaction conditions are appropriately selected from reaction times of 0.01 to 100 hours and from reaction temperatures of 0 to 200° C. Preferably the reaction time is 0.1 to 5 hours and the reaction temperature is 20 to 150° C.

Examples of preferred bases generally used include: inorganic compounds such as alkali metal hydroxides and alkaline earth metal hydroxides, alkali metal oxides and alkaline earth metal oxides, alkali metal hydrides and alkaline earth metal hydrides, alkali metal amides, alkali metal carbonates and alkaline earth metal carbonates (such as lithium carbonate, potassium carbonate and calcium carbonate), alkali metal bicarbonates (such as sodium bicarbonate); and organic metal compounds such as alkali metal alkyls, alkyl magnesium halides, alkali metal alkoxides, alkaline earth metal alkoxides and dimethoxy magnesium. Particularly preferred are potassium carbonate and sodium carbonate. In addition, the base is preferably used in an amount of 0.2 to 10 times equivalent, preferably 0.5 to 10 equivalents, most preferably 1 to 5 equivalents relative to the mass of the hyperbranched polymer having a halogen atom at a molecule terminal thereof.

When a primary amine or a secondary amine is used to be reacted with the hyperbranched polymer having a halogen atom at a molecule terminal thereof in the presence of a base, a hyperbranched polymer represented by Formula (5) can be obtained. In addition, when a tertiary amine is used, a hyperbranched polymer represented by Formula (6) can be obtained.

In obtaining a hyperbranched polymer having an amine terminal at a molecule terminal thereof by reacting a primary amine or secondary amine compound with a hyperbranched polymer having a halogen atom at a molecule terminal thereof in the absence of a base, a hyperbranched polymer represented by Formula (6) having an ammonium group terminal which is obtained through the protonation of a terminal secondary amine of tertiary amine corresponding to each of the above amine compounds in the hyperbranched polymer, is obtained.

In addition, also when the reaction is performed using a base, by incorporating an aqueous solution of an acid such as hydrochloric acid, hydrobromide, hydroiodide in an organic solvent, a hyperbranched polymer represented by Formula (6) which is obtained through the protonation of a terminal secondary amine or tertiary amine corresponding to each of the above amine compounds in the hyperbranched polymer, is obtained.

Further, when the hyperbranched polymer represented by Formula (5) has a phthalimide group at a molecule terminal thereof, through a hydrolysis by a hydrazine derivative such as hydrazine, methylhydrazine and phenylhydrazine, a hyperbranched polymer having a structure represented by Formula (22) in which both $R_4$ and $R_5$ in Formula (5) are hydrogen can be obtained. In addition, when the hyperbranched polymer represented by Formula (5) has a molecule terminal having a urethane bond, through an acid hydrolysis by trifluoro acetic acid, hydrochloric acid, acetic acid, sulfuric acid or the like, a hyperbranched polymer having a structure represented by Formula (22) in which both $R_4$ and $R_5$ in Formula (5) are hydrogen can be obtained.

[Chemical Formula 18]

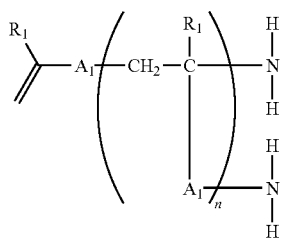

(22)

The hyperbranched polymer of the present invention having an amino group or an ammonium group at a molecule terminal thereof obtained by the above-described reaction method can be separated from the solvent out of the reaction solution by distilling-off the solvent or by a solid-liquid separation. Also, by adding the reaction solution to a poor solvent, the hyperbranched polymer of the present invention can be precipitated to be recovered as a powder.

In addition, in the hyperbranched polymer of the present invention having an amino group or an ammonium group at a molecule terminal thereof, a part of the molecule terminal may be remained as a halogen atom.

EXAMPLES

Hereinafter, the present invention is described in more detail referring to examples which should not be construed as limiting the scope of the present invention. In the Examples, the measurement of physical properties of a sample was performed under the following conditions using the following apparatuses.
(1) Melting Point Analysis
  Apparatus: manufactured by Rigaku Corporation; DSC8230
  Heating rate: 2° C./min
  Nitrogen supply: 60 mL/min
(2) Liquid Chromatography
  Apparatus: manufactured by Agilent; 1100 Series
  Column: Inertsil ODS-2
  Column temp: 40° C.
  Solvent: Acetonitrile/water=60/40 (volume ratio)
  Detector: RI
(3) Gel Permeation Chromatography
  Apparatus: manufactured by Shimadzu Corporation; SCL-10AVP
  Column: Shodex KF-804L+KF-803L
  Column temp: 40° C.
  Solvent: Tetrahydrofuran
  Detector: RI
(4) $^1$H-NMR spectrum
  Apparatus: manufactured by JEOL DATUM LTD.; JNM-LA400
  Solvent: $CDCl_3$
  Internal standard: Tetramethylsilane
(5) Element Analysis (carbon, hydrogen, nitrogen)
  Apparatus: manufactured by PerkinElmer Co., Ltd.; PE2400X
  Combustion tube temp.: 975° C.
(6) Element Analysis (bromine)
  Pre-treating apparatus: manufactured by Dia Instruments Co., Ltd; Automatic quick furnace AQE-100 type
  Combustion tube temp.: 1000° C.
  Analyzing apparatus: manufactured by Japan Dionex Co., Ltd.; DX500
  Column: AS9HC
  Eluant: $Na_2CO_3$ 9 mM
(7) Element Analysis (sulfur)
  Pre-treating apparatus: manufactured by Dia Instruments Co., Ltd; Automatic quick furnace AQF-100 type
  Combustion tube temp.: 1000° C.
  Analyzing apparatus: manufactured by Japan Dionex Co., Ltd; ICS-1500
  Column: Dionex AS12A
  Eluant $Na_2CO_3$ 2.7 mM—$NaHCO_3$ 0.3 mM
(8) Thermogravimetric Analysis
  Apparatus: manufactured by Seiko Instruments Inc.; TG/DTA320
  Heating rate: 10° C./min
  Air supply: 300 mL/min
(9) Contact Angle Measurement
  Apparatus: manufactured by Kyowa Interface Science Co., Ltd; Fully automatic contact angle meter CA-W type
  Temperature: 23.0° C.
  Humidity: 50%
  Liquid measure: 3 μL
  Stabilization time after liquid fixation: 5 seconds Reference Example 1

Synthesis of N,N-diethyldithiocarbamylmethylstyrene

In a 2-L reaction flask, 120 g of chloromethylstyrene (manufactured by Seimi Chemical Co., Ltd.; trade name: CMS-14), 181 g of Sodium N,N-diethyldithiocarbamidate trihydrate (manufactured by Kanto Chemical Co., Inc.) and 1,400 g of acetone were charged and while stirring the resultant mixture, the mixture was reacted at a temperature of 40° C. for 1 hour. After the completion of the reaction, deposited sodium chloride was filtered to be removed, and then acetone was distilled off from the reaction solution using an evaporator to thereby obtain a reaction crude powder. The obtained reaction crude powder was redissolved in toluene and the resultant liquid was separated into toluene/water. Thereafter, in a refrigerator having a temperature of −20° C., an objective was recrystallized from the toluene phase. The recrystallized substance was filtered and vacuum-dried to thereby obtain 206 g (yield; 97%) of an objective in the form of a white powder. The purity (area percentage) was 100% as measured by a liquid chromatography. In addition, the melting point was 56° C. as measured by a DSC measurement.

Reference Example 2

Synthesis of Styrene-based Hyperbranched Polymer Having Dithiocarbamate Group at Molecule Terminal Thereof In a 300 mL reaction flask, 108 g of N,N-diethyldithiocarbamylmethylstyrene and 72 g of toluene were charged and the resultant mixture was stirred to prepare a light yellow transparent solution, followed by replacing the inside of the reaction system with nitrogen. From the center of the solution, a high pressure mercury lamp of 100 W (manufactured by Sen Lights Co, Ltd.; HL-100) was lighted to perform a photopolymerization reaction by an internal irradiation while stirring the reaction solution at a temperature of 30° C. for 12 hours. Next, the reaction solution was added to 3,000 g of methanol to reprecipitate a polymer in a massive state having high viscosity and then a supernatant liquid was removed by a decantation. Further, the polymer was redissolved in 300 g of tetrahydrofuran and then the resultant solution was added to 3,000 g of methanol to reprecipitate the polymer in a slurry state. The slurry was filtered and vacuum dried to thereby obtain 48 g of an objective in the form of a white powder. The measured result of $^1$H-NMR spectrum is shown in FIG. 1. The weight average molecular weight Mw and the degree of dispersion Mw/Mn of the polymer were measured by a gel permeation chromatography in a converted molecular weight as polystyrene and found to be 20,900 and 4.9, respectively. The results of the element analysis were carbon: 64.6% by mass, hydrogen: 7.4% by mass, nitrogen: 5.0% by mass and sulfur 25.3% by mass.

Example 1

Synthesis of Styrene-based Hyperbranched Polymer Having a Halogen Atom at Molecule Terminal Thereof In a 300 mL reaction flask equipped with a condenser, 10 g of the hyperbranched polymer having a dithiocarbamate group at a molecule terminal thereof obtained in Reference Example 2 and 50 g of chloroform were charged and the inside of the reaction system was replaced with nitrogen. To the resultant mixture, a solution in which 16.0 g of bromine (manufactured by JUNSEI CHEMICAL Co., Ltd.) was dissolved in 50 g of chloroform, was added by drop to reflux the resultant mixture for 3 hours. The temperature was lowered to 30° C. and thereafter, a generated orange colored precipitation was separated by filtration.

To the reaction mixture, a saturated salt solution and 20% by mass of sodium thiosulfate were added to wash the organic phase. The solution was dropped into 500 g of methanol to reprecipitate. The resultant yellow powder was redissolved in 40 g of chloroform and the resultant solution was dropped into 500 g of methanol to reprecipitate. The resultant colorless powder was dried to thereby obtain 4.6 g of a hyperbranched polymer having a dithiocarbamate group at a molecule terminal thereof in which a dithiocarbamate group was substituted with a bromine atom. The weight average molecular weight Mw and the degree of dispersion Mw/Mn of the polymer were measured by a gel permeation chromatography in a converted molecular weight as polystyrene and found to be 6,600 and 2.2, respectively. The results of the element analysis were carbon: 50.2% by mass, hydrogen: 3.8% by mass, nitrogen: less than 1.0% by mass and bromine: 33.2% by mass. The measured result of $^1$H-NMR spectrum is shown in FIG. 2. It was observed that peaks ascribed to a methylene group in a dithiocarbamate group at 4.0 ppm and 3.7 ppm shown in FIG. 1 disappeared and a peak ascribed to a methyl group in a dithiocarbamate group at 1.3 ppm was reduced. From this result, it has become apparent that a dithiocarbamate group at a terminal of the hyperbranched polymer obtained in Reference Example 2 has been approximately 100% substituted with a halogen (bromine) atom. The obtained hyperbranched polymer has a structure represented by Formula (23):

[Chemical Formula 19]

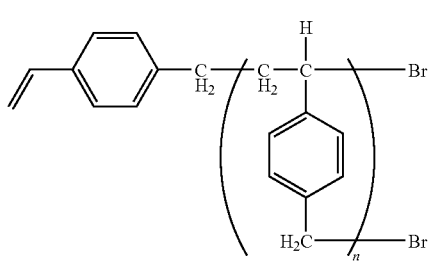

(23)

Example 2

Synthesis of Styrene-based Hyperbranched Polymer Having Trimethylammonium Group at Molecule Terminal Thereof In a 300 mL reaction flask equipped with a condenser, 0.50 g of the hyperbranched polymer represented by Formula (23) having a bromine atom at a molecule terminal thereof obtained in Example 1 and 3.0 g of N,N-dimethylformamide were charged and thereto, 0.59 g of 30% by mass trimethylamine aqueous solution (manufactured by Tokyo Chemical Industry Co., Ltd.) was added. At that time, the inside of the system became suspended. The inside of the system was replaced with nitrogen and heated at a temperature of 80° C. for 6 hours. The temperature was cooled to 30° C. and thereafter, a generated precipitation was washed with acetone. The obtained solid was dissolved in 3.0 g of water and reprecipitated in 20 g of acetone, followed by drying the resultant precipitate to obtain 0.33 g of a light brown powder. This powder was soluble in methanol or purified water with a solubility of 10% by mass or more. The measured result of $^1$H-NMR spectrum is shown in FIG. 3. It was observed that a peak ascribed to a methylene group in a benzyl group at 4.4 ppm shown in FIG. 2 was shifted to 4.7 ppm and a peak ascribed to a methyl group newly appeared at 3.3 ppm. From this result, it has become apparent that a bromine atom at a terminal of the hyperbranched polymer obtained in Example 1 has been approximately 100% substituted with a trimethylammonium group. The obtained hyperbranched polymer has a structure represented by Formula (24):

[Chemical Formula 20]

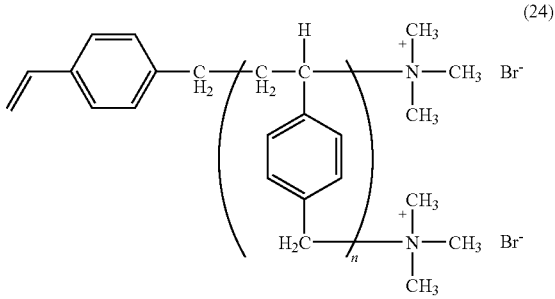

(24)

Example 3

Synthesis of Styrene-based Hyperbranched Polymer Having Tertiary Amino Group at Molecule Terminal Thereof In a 50 mL reaction flask equipped with a condenser, 1.0 g of the hyperbranched polymer represented by Formula (23) having a bromine atom at a molecule terminal thereof obtained in Example 1 and 10.0 g of N,N-dimethylformamide were charged and thereto, 1.1 g of phthalimide potassium (manufactured by Tokyo Chemical Industry Co., Ltd.) was added. The inside of the system was replaced with nitrogen and heated at a temperature of 80° C. for 4 hours. The temperature was cooled to 30° C. and thereafter, the resultant brownish-red solution was subjected to reprecipitation using 10 g of an ion-exchanged water. The resultant brown solid was dissolved in 10 g of chloroform and reprecipitated in 100 g of methanol, followed by drying the resultant precipitate to obtain 1.3 g of a light brown powder. The measured result of $^1$H-NMR spectrum is shown in FIG. 4. It was observed that a peak ascribed to a methylene group in a benzyl group at 4.4 ppm shown in FIG. 2 was shifted to 4.7 ppm and a broad peak ascribed to an aromatic ring newly appeared at from 7.5 ppm to 7.8 ppm. From this result, it has become apparent that a bromine atom at a terminal of the hyperbranched polymer obtained in Example 1 has been approximately 100% converted into phthalimide. The obtained hyperbranched polymer has a structure represented by Formula (25):

[Chemical Formula 21]

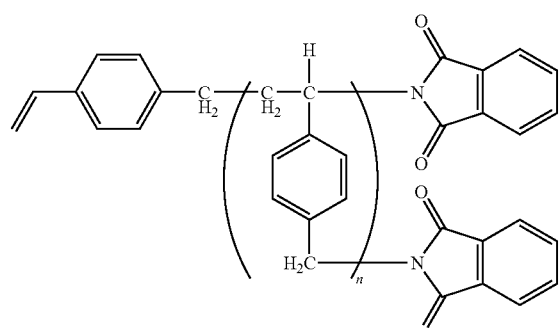

(25)

Example 4

Synthesis of Styrene-based Hyperbranched Polymer Having Secondary Amino Group at Molecule Terminal Thereof In a 50 mL reaction flask equipped with a condenser, 0.2 g of the hyperbranched polymer represented by Formula (23) having a bromine atom at a molecule terminal thereof obtained in Example 1 and 2.0 g of N,N-dimethylformamide were charged and thereto, 0.2 g of N-(tert-butoxycarbonyl)-1,2-ethylenediamine (manufactured by Tokyo Chemical Industry Co., Ltd.) was added. The inside of the system was replaced with nitrogen and heated at a temperature of 80° C. for 4 hours. The temperature was cooled to 30° C. and thereafter, the resultant brownish-red solution was subjected to reprecipitation using 80 g of an ion-exchanged water. The resultant precipitate was dried to obtain 0.2 g of a light brown powder. The measured result of $^1$H-NMR spectrum is shown in FIG. 5. From such an observation that a peak ascribed to a terminal methyl group sharply appeared at 1.3 ppm and peaks ascribed to a methylene group in an ethylenediamine site appeared at 3.0 ppm and 3.3 ppm, it has become apparent that a bromine atom at a terminal of the hyperbranched polymer obtained in Example 1 has been approximately 100% aminated. The obtained hyperbranched polymer has a structure represented by Formula (26):

[Chemical Formula 22]

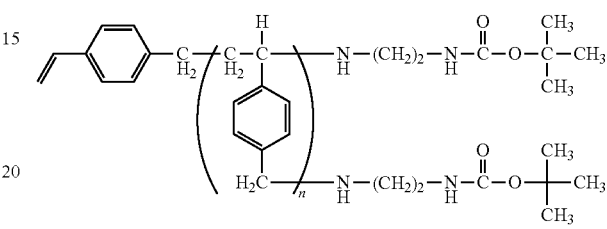

(26)

Example 5

Synthesis of Styrene-based Hyperbranched Polymer Having Primary Amino Group at Molecule Terminal Thereof In a 50 mL reaction flask equipped with a condenser, 0.2 g of the hyperbranched polymer represented by Formula (25) obtained in Example 3 and 2.0 g of N,N-dimethylformamide were charged and thereto, 0.12 g of hydrazine monohydrate (manufactured by Kanto Chemical Co., Inc.) was added, followed by replacing the inside of the reaction system with nitrogen. The resultant solution was heated and stirred for 3 hours and was cooled to room temperature, and thereafter, the resultant brownish-red solution was subjected to reprecipitation using 10 g of acetone. The resultant precipitate was dried to obtain 0.1 g of a light brown powder. The measured result of $^1$H-NMR spectrum is shown in FIG. 6. Since a broad peak ascribed to an aromatic ring at from 7.5 ppm to 7.8 ppm which appeared in FIG. 4 disappeared, it has become apparent that a phthalimide group at a terminal of the hyperbranched polymer obtained in Example 3 has been approximately 100% converted into amine. The obtained hyperbranched polymer has a structure represented by Formula (27):

[Chemical Formula 23]

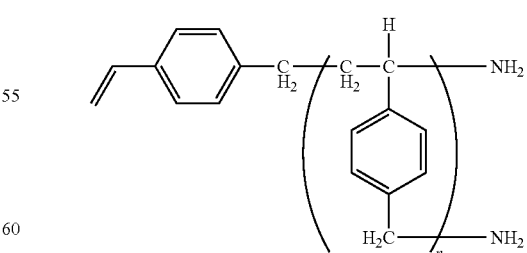

(27)

Example 6

A solution in which the hyperbranched polymer synthesized in Example 2 was dissolved in methanol so that the concentration of the hyperbranched polymer became 10% by mass, was prepared. This solution was treated with 0.45 μm syringe filter and was coated on the whole surface of a glass substrate washed with a detergent and ion-exchanged water using a spin coater (300 rpm×5 seconds and 2,500 rpm×25 seconds), and the coated substrate was dried on a hot plate at a temperature of 150° C. for 5 minutes. The contact angle of purified water relative to the glass substrate surface-treated with the hyperbranched polymer was 21.0°. Here, the contact angle of purified water relative to an untreated glass substrate was 41.9°. From these measured results, it has become apparent that a surface of a glass substrate was hydrophilic-converted by coating the surface with the hyperbranched polymer synthesized in Example 2.

The novel hyperbranched polymer of the present invention having a halogen atom at a molecule terminal thereof contains a halogen atom as a reactive functional group, so that it can be utilized as an intermediate for producing a novel hyperbranched polymer shown in Examples 2 to 5. Further it can be derived to various hyperbranched polymers or the like by utilizing organic synthesis reactions such as hydroxylation, etherification, nitrilification, thioetherification, thiolation and phosphonium-conversion. Hyperbranched polymers derived in Examples 2 to 5 having an amine group at a molecule terminal thereof can be reacted with acids having a carboxyl group or the like to be further derived to various functional hyperbranched polymers or the like. In addition, a hyperbranched polymer having an ammonium group at a molecule terminal thereof is soluble in water and an alcohol solvent such as methanol and ethanol, so that is useful as a hydrophilic-conversion treating agent for a glass substrate.

INDUSTRIAL APPLICABILITY

The hyperbranched polymer of the present invention can be utilized as painting materials, adhesive materials, resin filler, various forming materials, nanometer pore forming agent, resist materials, electronic materials, printing materials, battery materials, medical materials, intermediate raw materials and the like.

BRIEF DESCRIPTION OF THE DRAWINGS

FIG. 1 is a $^1$H-NMR spectrum of a hyperbranched polymer obtained in Reference Example 2.
FIG. 2 is a $^1$H-NMR spectrum of a hyperbranched polymer obtained in Example 1.
FIG. 3 is a $^1$H-NMR spectrum of a hyperbranched polymer obtained in Example 2.
FIG. 4 is a $^1$H-NMR spectrum of a hyperbranched polymer obtained in Example 3.
FIG. 5 is a $^1$H-NMR spectrum of a hyperbranched polymer obtained in Example 4.
FIG. 6 is a $^1$H-NMR spectrum of a hyperbranched polymer obtained in Example 5.

The invention claimed is:
1. A hyperbranched polymer represented by Formula (1):

[Chemical Formula 1]

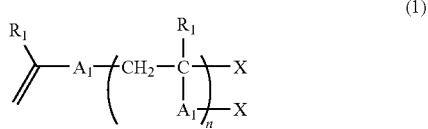

(1)

(where X represents a halogen atom; $R_1$ represents a hydrogen atom or a methyl group; $A_1$ represents a structure represented by Formula (2):

[Chemical Formula 2]

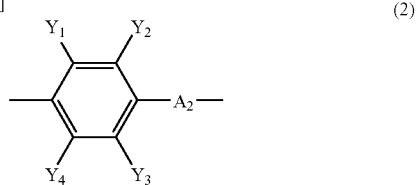

(2)

(where $A_2$ represents a linear, branched or cyclic alkylene group having 1 to 30 carbon atoms, which may contain an ether bond or an ester bond; each of $Y_1$, $Y_2$, $Y_3$ and $Y_4$ represents a hydrogen atom, an alkyl group having 1 to 20 carbon atoms, an alkoxy group having 1 to 20 carbon atoms, a nitro group, a hydroxy group, an amino group, a carboxyl group or a cyano group); and n represents the number of repeating unit structures which is an integer of 5 to 100,000),
wherein the weight average molecular weight is 500 to 5,000,000, as measured by a gel permeation chromatography in a converted molecular weight as polystyrene.
2. The hyperbranched polymer according to claim 1, wherein the X represents a chlorine atom, a bromine atom or an iodine atom.
3. The hyperbranched polymer according to claim 1, wherein the $A_1$ is a structure represented by Formula (3):

[Chemical Formula 3]

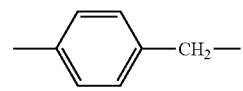

(3)

4. A production method of a hyperbranched polymer according to claim 1 having a halogen atom at a molecule terminal thereof comprising substituting a dithiocarbamate group at a molecule terminal of a hyperbranched polymer obtained by living-radical polymerizing a dithiocarbamate compound represented by Formula (4):

[Chemical Formula 4]

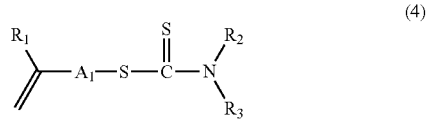

(4)

(where $R_1$ and $A_1$ represent the same as defined in Formula (1); and each of $R_2$ and $R_3$ represents an alkyl group having 1 to 5 carbon atoms, a hydroxyalkyl group having 1 to 5 carbon atoms or an arylalkyl group having 7 to 12 carbon atoms, or $R_2$ and $R_3$ may form a ring together with a nitrogen atom bonded to $R_2$ and $R_3$), with a halogen atom by a halogenating agent.
5. The production method of a hyperbranched polymer according to claim 4, wherein the dithiocarbamate compound is N,N-diethyldithiocarbamylmethylstyrene.
6. The production method of a hyperbranched polymer according to claim 4, wherein the substitution reaction is performed by reacting a hyperbranched polymer having a dithiocarbamate group at a molecule terminal thereof with a halogenating agent in an organic solvent solution containing the hyperbranched polymer having a dithiocarbamate group at a molecule terminal thereof.
7. The production method of a hyperbranched polymer according to claim 4, wherein as the halogenating agent, at least one compound selected from chlorine, N-chlorosuccinimide, chlorinated isocyanuric acid, phosphorus trichloride, bromine, N-bromosuccinimide, N-bromoglutarimide, N,N', N"-tribromoisocyanuric acid, sodium N-bromoisocyanurate, iodine, N-iodosuccinimide, potassium iodate and periodic acid, is used.

8. The production method of a hyperbranched polymer according to claim 4, wherein as the halogenating agent, at least one compound of bromine and N-bromosuccinimide is used.

9. A hyperbranched polymer represented by Formula (5):

[Chemical Formula 5]

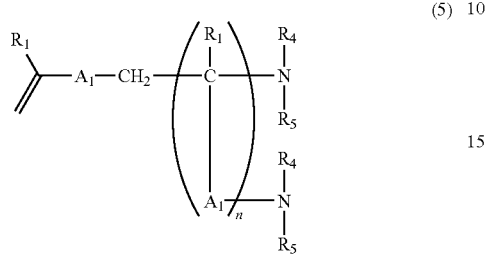

(5)

(where $R_1$ and $A_1$ represent the same as defined in Formula (1); each of $R_4$ and $R_5$ represents a hydrogen atom, a linear, branched or cyclic alkyl group having 1 to 20 carbon atoms, a hydroxyalkyl group having 1 to 5 carbon atoms, an aryl group having 6 to 14 carbon atoms, an arylalkyl group having 7 to 20 carbon atoms, an alkylaryl group having 7 to 20 carbon atoms or —$(CH_2)_m$—NH(CO)—O—$C(CH_3)_3$ (where m represents an integer of 2 to 6), or $R_4$ and $R_5$ may form a ring together with a nitrogen atom bonded to $R_4$ and $R_5$; and n represents the number of repeating unit structures which is an integer of 5 to 100,000), wherein the weight average molecular weight is 500 to 5,000,000, as measured by a gel permeation chromatography in a converted molecular weight as polystyrene.

10. The hyperbranched polymer according to claim 9, wherein in the hyperbranched polymer represented by Formula (5), $R_4$ and $R_5$ represent a hydrogen atom.

11. The hyperbranched polymer according to claim 9, wherein in the hyperbranched polymer represented by Formula (5), $R_1$, $R_4$ and $R_5$ represent a hydrogen atom and X is a structure represented by Formula (3).

12. A hyperbranched polymer represented by Formula (6):

[Chemical Formula 6]

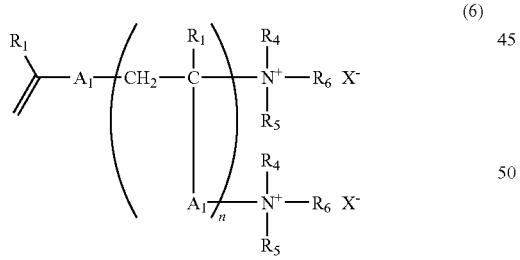

(6)

(where $R_1$ and $A_1$ represent the same as defined in Formula (1); $X^-$ represents an anion of a halogen atom; each of $R_4$, $R_5$ and $R_6$ represents a hydrogen atom, a linear, branched or cyclic alkyl group having 1 to 20 carbon atoms, a hydroxyalkyl group having 1 to 5 carbon atoms, an aryl group having 6 to 14 carbon atoms, an arylalkyl group having 7 to 20 carbon atoms, an alkylaryl group having 7 to 20 carbon atoms or —$(CH_2)_m$—NH(CO)—O—$C(CH_3)_3$ (where m represents an integer of 2 to 6), or $R_4$, $R_5$ and $R_6$ may form a ring together with a nitrogen atom bonded to $R_4$, $R_5$ and $R_6$; and n represents the number of repeating unit structures which is an integer of 5 to 100,000).

wherein the weight average molecular weight is 500 to 5,000,000, as measured by a gel permeation chromatography in a converted molecular weight as polystyrene.

13. The hyperbranched polymer according to claim 12, wherein in the hyperbranched polymer represented by Formula (6), $R_4$, $R_5$ and $R_6$ represent a methyl group.

14. The hyperbranched polymer according to claim 12, wherein in the hyperbranched polymer represented by Formula (6), $R_1$ represents a hydrogen atom; $R_4$, $R_5$ and $R_6$ represent a methyl group; X represents a bromine atom; and $A_1$ has a structure represented by Formula (3).

15. A production method of the hyperbranched polymer according to claim 9, comprising reacting the hyperbranched polymer represented by Formula (1) having a halogen atom at a molecule terminal thereof with an amine compound in the presence of a base in water and/or an organic solvent solution.

16. A production method of the hyperbranched polymer according to claim 10, comprising: reacting the hyperbranched polymer represented by Formula (1) having a halogen atom at a molecule terminal thereof with phthalimide in the presence of a base in water and/or an organic solvent solution to convert the molecule terminal to the phthalimide group; and further hydrolyzing the hyperbranched polymer having a phtbalimide group with a hydrazine compound to convert it to a hyperbranched polymer in which a molecule terminal:

[Chemical Formula 7]

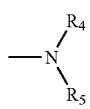

in Formula (5) represents —$NH_2$.

* * * * *

UNITED STATES PATENT AND TRADEMARK OFFICE
CERTIFICATE OF CORRECTION

PATENT NO.      : 8,338,554 B2
APPLICATION NO. : 12/310543
DATED           : December 25, 2012
INVENTOR(S)     : Kei Yasui et al.

It is certified that error appears in the above-identified patent and that said Letters Patent is hereby corrected as shown below:

Please amend the title page as follows:

Item (75) Inventors, please change "Hiroki Takemoto, Kitakyushi (JP)" to --Hiroki Takemoto, Kitakyushu (JP)--.

Signed and Sealed this
Twenty-sixth Day of March, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,338,554 B2
APPLICATION NO. : 12/310543
DATED : December 25, 2012
INVENTOR(S) : Kei Yasui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 474 days.

Signed and Sealed this
Fifteenth Day of July, 2014

Michelle K. Lee
*Deputy Director of the United States Patent and Trademark Office*